(12) United States Patent
Zhang et al.

(10) Patent No.: US 11,251,844 B2
(45) Date of Patent: Feb. 15, 2022

(54) METHODS AND DEVICES FOR CONFIGURATION OF REFERENCE SIGNALS

(71) Applicant: ZTE Corporation, Guangdong (CN)

(72) Inventors: Nan Zhang, Guangdong (CN); Yu Ngok Li, Guangdong (CN); Zhaohua Lu, Guangdong (CN); Chuangxin Jiang, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/947,674

(22) Filed: Aug. 12, 2020

(65) Prior Publication Data

US 2020/0382182 A1    Dec. 3, 2020

Related U.S. Application Data

(63) Continuation of application No. PCT/CN2018/076840, filed on Feb. 14, 2018.

(51) Int. Cl.
*H04B 7/0456* (2017.01)
*H04L 5/00* (2006.01)
*H04L 5/02* (2006.01)

(52) U.S. Cl.
CPC ......... *H04B 7/0473* (2013.01); *H04L 5/0048* (2013.01); *H04L 5/026* (2013.01)

(58) Field of Classification Search
CPC ..... H04B 7/0473; H04L 5/0048; H04L 5/026; H04L 5/00
See application file for complete search history.

(56) References Cited

U.S. PATENT DOCUMENTS

| | | | | |
|---|---|---|---|---|
| 2011/0103324 | A1* | 5/2011 | Nam | H04B 7/0452 370/329 |
| 2015/0036606 | A1* | 2/2015 | Ji | H04W 72/0406 370/329 |
| 2015/0181572 | A1* | 6/2015 | Guo | H04W 4/06 370/312 |
| 2016/0020929 | A1* | 1/2016 | Yamazaki | H04L 25/4906 375/300 |
| 2017/0164227 | A1 | 6/2017 | Zwirn | |
| 2019/0207731 | A1* | 7/2019 | Park | H04B 7/0486 |

FOREIGN PATENT DOCUMENTS

| | | |
|---|---|---|
| CN | 102165828 B | 7/2012 |
| CN | 102714866 A | 10/2012 |
| CN | 106256107 A | 12/2016 |
| CN | 107425947 A | 12/2017 |

OTHER PUBLICATIONS

International Search Report and Written Opinion dated Nov. 5, 2018 for International Application No. PCT/CN2018/076840, filed on Feb. 14, 2018 (6 pages).
Office Action for copending Chinese Application No. 201880085640.3 dated May 27, 2021, 6 pages.

* cited by examiner

*Primary Examiner* — Oussama Roudani
(74) *Attorney, Agent, or Firm* — Perkins Coie, LLP

(57) ABSTRACT

In an exemplary embodiment, a wireless communication method is disclosed for indicating a mapping between a set of reference signals and data streams so that a reference signal can be transmitted by one or more of multiple network nodes based on the mapping. The disclosed embodiments provide mapping and additional rules.

14 Claims, 5 Drawing Sheets

```
┌─────────────────────────────────────────────────────────────┐
│ Indicating a mapping between a set of reference signals and data streams │ ─ 202
└─────────────────────────────────────────────────────────────┘
                              │
                              ▼
┌─────────────────────────────────────────────────────────────┐
│ Transmitting a reference signal by one or more network nodes based on the mapping │ ─ 204
└─────────────────────────────────────────────────────────────┘
```

METHODS AND DEVICES FOR CONFIGURATION OF REFERENCE SIGNALS

CROSS REFERENCE TO RELATED APPLICATIONS

This patent document is a continuation of and claims benefit of priority to International Patent Application No. PCT/CN2018/076840, filed on Feb. 14, 2018. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

This disclosure relates to methods, systems, and devices for indicating a mapping between a set of reference signals and data streams, where the mapping is based on a rule, and where a reference signal is transmitted by one or more network nodes based on the mapping.

In some embodiments, the network nodes include any one or more of a transmission reception point (TRP), a base station (BS), a relay point, a user equipment (UE), and an antenna port.

In an exemplary embodiment, the rule based mapping is indicated by a pre-defined table that includes a list of identifiers and a list of mapped resources, each identifier identifies a set of mapped resources, and each mapped resource identifies the reference signal mapped to the data streams. In some embodiments, the list of identifiers are grouped to form one or more groups. In some embodiments, at least one group includes a same number of mapped resources. In some embodiments, at least one group includes a same number of code division multiplexing (CDM) groups occupied by the mapped resources. In some embodiments, the number of code division multiplexing (CDM) groups have an absence of data.

In some embodiments, the mapped resource within one group is mapped to two or more data stream groups, where a number of data stream within an n-th group Rn is computed by:

$$\Sigma_{n=1}^{N} R_n = R,$$

where R is a transmission rank supported by a number of mapped resources and $R1 \le \cdots \le Rn$, where R1 is a lowest number of rank and Rn is a highest number of rank supported in one data stream group.

In some embodiments, the one or more groups are selected by a high-layer signaling message. In some embodiments, the high-layer signaling message includes a MAC Control Element (CE) signaling message. In some embodiments, a bit-width $B_{entry}$ of a codepoint in a downlink control indicator (DCI) is computed based on:

$$B_{entry} = \lceil \log_2 \Sigma_{n=1}^{N} l_n \rceil \text{ or } \Sigma_{n=1}^{N} l_n \text{ bits,}$$

where, $l_n$ refers to a number of identifiers within the selected group.

In some embodiments, the one or more groups are selected by a downlink control indicator (DCI). In some embodiments, a bit-width $B_{group}$ of a codepoint in the DCI is computed based on a number of group or $\lceil \log_2 N \rceil$, where N refers to a total number of groups.

In some embodiments, a bit-width of codepoint in DCI includes a first most significant bit that refers to a selected group followed by the selected identifier within the selected group.

In some embodiments, the identifiers are grouped to form only one group that is selected by default without additional signaling.

In some embodiments, a start and length indicator value (SLIV) to enable or disable one or more identifier is computed by:

$$SLIV = L(L_{Act}-1) + L_{start}, \text{ in response to } (L_{Act}-1) \le \lfloor L/2 \rfloor, \text{ or}$$

$$SLIV = L(L - L_{Act}+1) + (L-1-L_{start})$$

where, L refers to a number of identifiers, $L_{start}$ refers to an identifier associated with a first enabling or disabling mapped resource, $L_{Act}$ is a number of enabled or disabled identifiers.

In some embodiments, a subset of the list of identifiers is enabled via a control signaling message.

In some embodiments, the control signaling message includes a radio resource control (RRC) signaling message or a MAC Control Element (CE) signaling message. In some embodiments, an order of the reference signal mapped to data streams is modified via a downlink control indicator (DCI). In some embodiments, a correspondence between a mapped resource and either a codeword (CW) or a network node is modified via a downlink control indicator (DCI).

In another exemplary embodiment, the rule based mapping is indicated by a pre-defined table that includes a list of identifiers and a list of mapped resources, each identifier identifies a set of mapped resources, and each mapped resource identifies the reference signals mapped to the network nodes.

In some embodiments, a radio resource control (RRC) signaling message allocates one or more reference signals to a network node.

In some embodiments, a reference signal is selected by a downlink control indicator (DCI). In some embodiments, a bit-width of a codepoint in the DCI is based on a total number of mapped resources.

In some embodiments, the method further includes refraining from assigning reference signals belonging to a same CDM group to different network nodes.

In some embodiments, the rule further specifies that a set of reference signals is assigned to one network node in a case where a fully overlapping resource allocation (RA) scheme is supported.

In some embodiments, the rule further specifies that a set of reference signals is assigned to the network nodes in a case where only a non-overlapping resource allocation (RA) is supported among the network nodes that share a reference signal.

In some embodiments, the rule further specifies that a reference signal is assigned to a first network node in a case where data transmission from a second network node rate matches around all reference signals assigned to M network node except the reference signal allocated for the second network node and not used in the data transmission, where M is an integer value.

In some embodiments, the rule further specifies that a reference signal is assigned to the network nodes in a case where data transmission from a network node rate matches around reference signal allocated for the network node and used in the data transmission.

In some embodiments, the rule further specifies that a set of identifiers are assigned to one network node in a case where a fully overlapping resource allocation (RA) scheme among the network nodes is supported.

In some embodiments, the rule further specifies that a set of identifiers are assigned to the network nodes in a case where non-overlapping resource allocation (RA) is supported among the network nodes that share same identifier.

In some embodiments, the rule further specifies that a set of identifiers are assigned to a first network node in a case where data transmission from a second network node rate matches around all reference signal assigned to M network node except the reference signal allocated for the second network node and not in the data transmission, where M is an integer value.

In some embodiments, the rule further specifies that a set of identifiers are assigned to the network nodes in a case where data transmission from a network node rate matches around reference signal allocated for the network node and used in the data transmission.

In some embodiments, the rule further specifies that a plurality of control information with same format is transmitted from different network nodes to schedule a corresponding data in a case where a same value in a codepoint for indicating a reference signal assignment is transmitted in all control information.

In some embodiments, the rule further specifies that a plurality of control information is transmitted from different network nodes to schedule a corresponding data in a case where a DCI codepoint for indicating a selected reference signal is transmitted in a control information from a host network node.

In some embodiments, the rule further specifies that the reference signals are listed in an order from a first transmission rank to a last transmission rank supported by a network node.

In some embodiments, at least some reference signal are quasi co-located (QCL).

In some embodiments, one or more reference signals are mapped to a n-th data stream group that includes Rn data streams, where Rn is computed according to:

$\Sigma_{n=1}^{N} R_n = R$, and

R1~Rn have an integer value between [1, R−1],
where R is a transmission rank and where Rn is the data stream group of the mapping.

In some embodiments, one or more reference signals are mapped to a first data stream group that includes R1 data streams and a second data stream group that includes R2 data streams that are computed according to:

$R1 = \lfloor R/2 \rfloor$, and $R2 = R - R1$, where R is a transmission rank.

In some embodiments, one or more reference signals are mapped to a n-th data stream group that includes Rn data streams, where Rn is computed according to:

$\Sigma_{n=1}^{N} R_n = R$

R1~Rn have an integer value between [2, R−1],
where R is a transmission rank and where Rn is the data stream group of the mapping.

In some embodiments, $R1 \leq \cdots \leq Rn$, where R1 is a lowest number of rank and Rn is a highest number of rank supported in one data stream group.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Current wireless systems support equal allocation of transmission layer or rank, for codewords and demodulation reference signal (DM-RS) ports. For example, if a total rank=N, and the allocated rank for a first codeword (CW) or transmission reception unit (TRU) is N1=floor(N/2), then N2=N−N1. Current wireless systems follow the same rule for configuration of reference signals, such as DM-RS ports. Thus, conventional wireless technology discloses a fixed CW to layer mapping and corresponding DM-RS allocation.

This patent document discloses among other things exemplary techniques for allocating quasi co-located (QCL) DM-RS ports for one CW or TRU. In some embodiment disclosed in this patent document, antenna ports can be QCL. Antenna ports may be referred to as QCL if the mobile station (UE) can derive or assume or utilize large scale channel properties as measured on one antenna port to be applicable to the associated QCL antenna port. As an example, a channel estimate based on port A can be used for port B at the UE. The large scale channel properties that may be considered can include, for example, any one or more of Doppler spread, Doppler shift, delay spread, average delay, average gain, or spatial parameters.

Current wireless systems also cannot support the flexible CW to layer mapping. This patent document also discloses exemplary embodiments to support flexible mapping of CW to transmission layer by enhancing current DM-RS table and by providing indication of DM-RS port(s) mapped to one or more transmission layers.

Figures 1A, 1B:
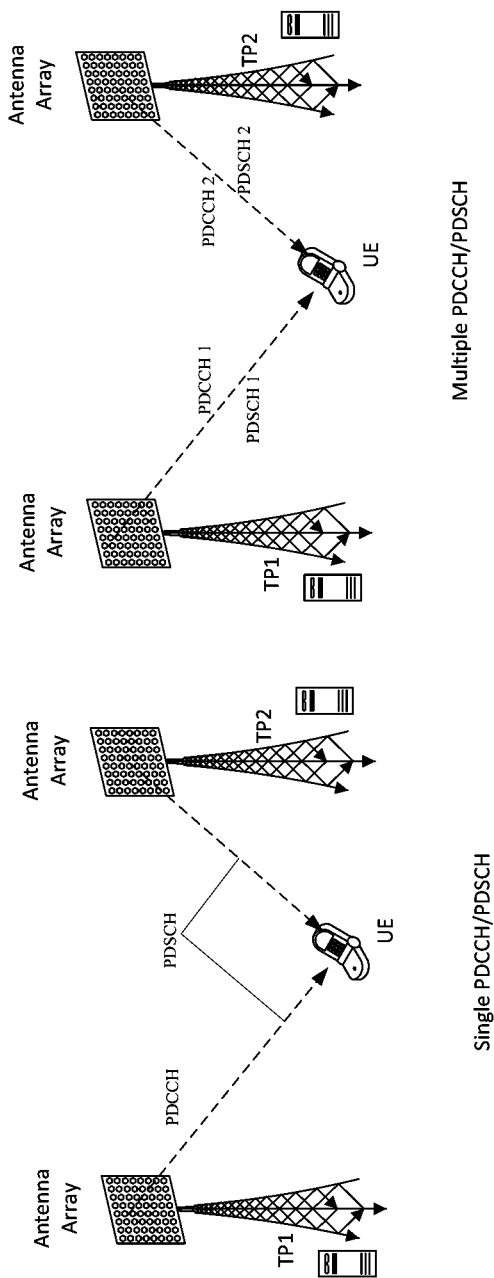
FIGS. 1A and 1B show a user device (UE) in communication with transmission reception points (TRPs).

FIGS. 1A and 1B show a user device (UE) in communication with transmission reception points (TRPs) TP1 and TP2. As shown in FIG. 1A, current wireless systems support a single physical downlink control channel (PDCCH) or a single physical downlink shared channel (PDSCH) where the corresponding allocation of DM-RS ports is indicated via codepoint in DCI. In conventional wireless systems, DM-RS port indication is done via the codepoint in DCI and each codepoint corresponds to one entry of a pre-defined DM-RS table that is fixed for used DM-RS pattern and number of CW. Table 1 shows DM-RS port(s) associated with corresponding entry index. As shown in Table 1, the number of total entry can be fixed and the order of DM-RS is listed in an ascending order without considering any specific rule for the mapping between DM-RS port and data stream.

TABLE 1

| Value | DMRS port(s) |
|---|---|
| 0 | 0-4 |
| 1 | 0-5 |
| 2 | 0, 1, 2, 3, 6 |
| 3 | 0, 1, 2, 3, 6, 8 |
| 4 | 0, 1, 2, 3, 6, 7, 8 |
| 5 | 0, 1, 2, 3, 6, 7, 8, 9 |
| 6-63 | Reserved |

As shown in FIG. 1B, multiple PDCCHs or PDSCHs can be transmitted to a UE, which can increase the potential for a collision of reference signals transmitted using a DM-RS port. For example, a same DM-RS port can be allocated to two PDSCHs in an overlapped resource so that interference can occur for DM-RS channel estimation and performance can degrade.

The exemplary embodiments in this patent document disclose, among other things, a wireless communication method for indicating a mapping between a set of reference signals, such as DMRS ports, and data streams. Based on the mapping, a reference signal can be transmitted by one or more network nodes. As further explained below, the mapping can be based on a rule. The network nodes can include any one or more of a transmission reception point (TRP), a base station (BS), a relay point, a user equipment (UE), or an antenna port or panel. Data stream can include, for example, independent data transmitted from single antenna port or TRP, or a layer of data where multiplexed transmission is supported.

In the description below, section headings are used only to facilitate the understanding of the disclosed subject matter and do not limit the scope of the claimed subject matter in any way.

I. First Embodiment—an Exemplary Configuration of Reference Signal (RS) for Flexible Mapping of CW to Transmission Layer In an exemplary embodiment, signaling from a network node can restrict the configuration of an exemplary pre-determined DM-RS table or entries within the table. Signaling such as Radio Resource Control (RRC) message, or Medium Access Control (MAC) message, or DCI message, or any combinations thereof, can be used to restrict entries within the pre-determined table. For embodiments that use the DCI message, the bit-width in DCI for DM-RS port indication can be adaptive according to the grouping. As an example, if a table with 16 entries are equally grouped into four groups, and only one group is selected by high layer signaling, then the bit that indicates the corresponding entry in the table can be two bits to identify four entries. As another example, if a table with 16 entries is equally grouped into two groups, and only one group is selected by high layer signaling, then the bit that indicates the corresponding entry in the table can be three bits to indicated one of the entry within the selected group.

The exemplary pre-defined table can be organized so that one or more reference signals can be mapped to an nth data stream group that can include Rn data streams. Rn can be computed according to:

$\sum_{n=1}^{N} R_n = R$, here R1~Rn have an integer value between [1, R−1], where R is a transmission rank. In some embodiments, R1≤ · · · ≤Rn so that R1 can be the lowest number of rank and Rn can be a highest number of rank supported in one data stream group.

In some embodiments, exemplary pre-defined table can be organized based on the following principle. For given transmission rank or data stream R ($1 \leq R \leq R_{max}$, e.g., $R_{max}=8$), the following combination of layer groups can be supported:

(R1,R2), here R1+R2=R, (R1,R2∈[1,R−1]),

The DM-RS groups assigned R1 or R2 can be QCL.

a. Exemplary Reference Signal Table

An exemplary pre-determined reference signal table, for example, as shown in Table 2 below, includes a mapping between DM-RS port(s) and transmission layer(s) where the mapping is identified by L entry identifiers that can be grouped to form N groups. The N groups can be configured by RRC or MAC signaling following at least one of the following options:

Option #1: Table 2 illustrates an exemplary pre-defined table that can include a list of entry identifiers and a list of mapped resources. Each entry identifier identifies mapped resources and each mapped resource identifies the reference signals, such as DM-RS ports, mapped to data streams, such as transmission layers. In Table 2, the mapping of DM-RS port(s) to transmission layer is shown in an ascending order. For example, for entry ID 0, DM-RS port 0, 1, 2, 3, 4 are ordered to correspond to transmission layers 1, 2, 3, 4, 5.

In some embodiments, the list of entry identifiers can be grouped into one or more groups where each group can be organized by a total number of allocated DM-RS ports in each entry or number range. For example, the pre-determined Table 2 designed for two CW enabled case with L=17, the grouping can be done as {0~1}, {2~5}, {6~11}, {12~16} or {0~5}, {6~11}, {12~16}. The activation of groups can be associated with a transmission rank restriction for CSI feedback in an implicit way by using the transmission rank. For example, if only transmission rank 5~6 is supported, the group(s) containing {0~5} entries can be activated.

TABLE 2

| Two CW enabled | |
|---|---|
| Entry ID | DMRS port(s) mapping to each layer in ascending order |
| 0 | 0-4 |
| 1 | 4, 0, 1, 2, 3 |
| 2 | 0-5 |
| 3 | 0, 1, 6, 2, 3, 8 |

TABLE 2-continued

Two CW enabled

| Entry ID | DMRS port(s) mapping to each layer in ascending order |
|---|---|
| 4 | 0 1 6 7 2 4 |
| 5 | 2, 0, 1, 6, 7, 4 |
| 6 | 0, 1, 6, 7, 2, 3, 8 |
| 7 | 2, 3, 8, 0, 1, 6, 7 |
| 8 | 0, 1, 6, 7, 4, 2, 3 |
| 9 | 2, 3, 0, 1, 6, 7, 4 |
| 10 | 0, 1, 6, 7, 2, 3, 4 |
| 11 | 4, 0, 1, 6, 7, 2, 3 |
| 12 | 0, 1, 6, 7, 2, 3, 8, 9 |
| 13 | 0, 1, 6, 2, 3, 8, 9, 4 |
| 14 | 4, 2, 3, 8, 9, 0, 1, 6 |
| 15 | 0, 1, 6, 7, 2, 3, 4, 5 |
| 16 | 2, 3, 4, 5, 0, 1, 6, 7 |

Option #2: Each group can be organized by the occupied number of code division multiplexing (CDM) groups. DM-RS can have certain pattern and each port can occupy certain resource elements, which can be shared among ports in either frequency or time domain or jointly. Each CDM group can be considered as a set of time or frequency resources shared by reference signal port. The number of occupied CDM groups can refer a number of resources that are occupied by the mapped resources. In some embodiments, as further explained below, at least one group includes a same number of CDM groups occupied by the mapped resources.

Figure 4A:
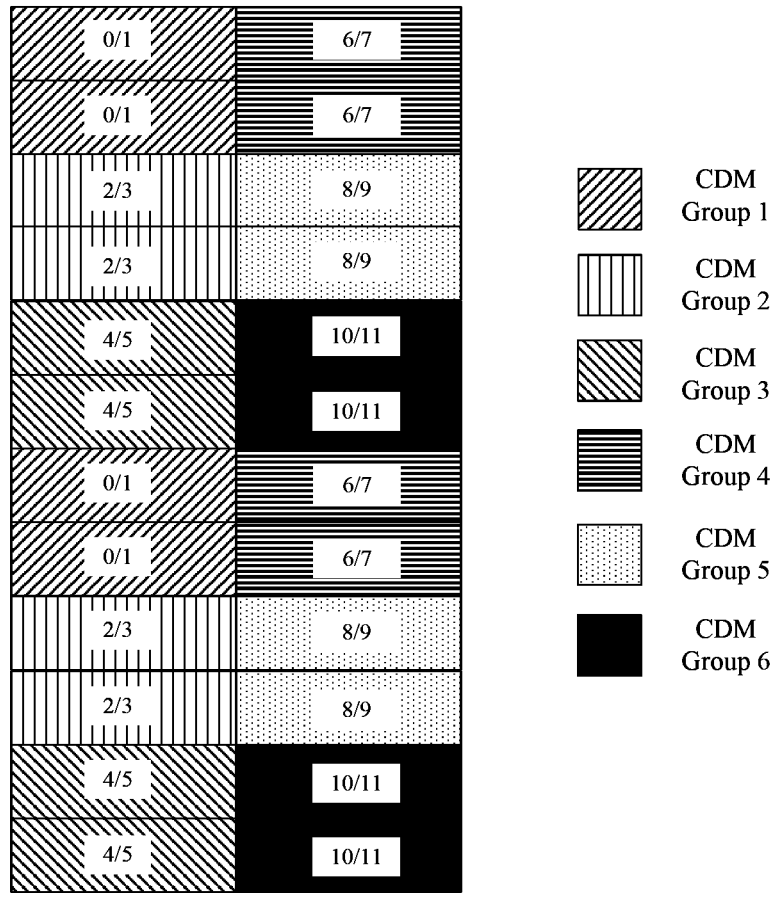
FIGS. 4A to 4B show some examples of relationship between demodulation reference signal (DM-RS) ports and Code Division Multiplexing (CDM) groups.
Figure 4B:
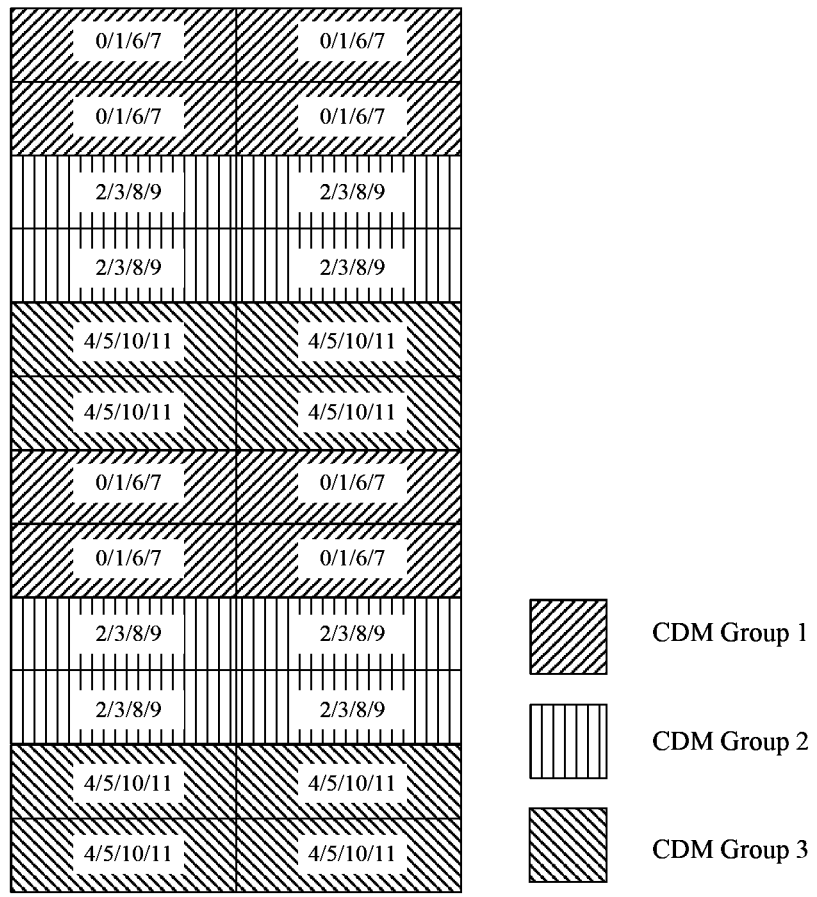

FIGS. 4A and 4B shown two examples of a DM-RS pattern with two symbols where the DM-RS port within the resource element indicated by the same pattern is within the same CDM group. The DM-RS ports marked by same ports can be considered as a CDM group. For example, in FIG. 4A, DM-RS ports {0, 1} can be within one CDM group, and in FIG. 4B, DM-RS ports {0, 1, 6, 7} can also be within one CDM group.

In some embodiments for option #2, for a given total allocated DM-RS port, the entry ID occupied by the minimum number of CDM groups can be grouped as the first group, and the remaining entry IDs can be considered as the second group. The minimum number of CDM group can refer to a minimum number of CDM group that are occupied by the assigned DM-RS for each rank. For example, for RANK 6 (e.g. entry 2~5 in Table 2), the DM-RS port {0, 1, 6}{2, 3, 8} occupy two CDM groups, and the DM-RS ports in other entries occupy more, for example, for the second entry, {0, 1}{2, 3}{4, 5} with three CDM group. As another example, for the pre-determined DM-RS Table 2, the grouping can be done as: {0, 1, 3, 6, 7, 12} and {2, 4, 5, 8, 9, 10, 11, 13, 14, 15, 16}

Option #3: Based on the type of scheduling, for example, multi-user (MU), a number of CDM group as described above in Option #2 can be without data.

Option #4: For all given transmission rank R, the entry IDs supporting the certain rank combination can be grouped as the first group, the remaining entries can be considered as the second group. In some embodiments, the transmission rank combination (R1, R2) can be based on at least one of the following rules:

Rule 1: $R1=\lfloor R/2 \rfloor$, $R2=R-R1$; or
Rule 2: $R1+R2=R$, $(R1, R2 \in [2, R-1])$;

For example, for the predetermined DM-RS Table 2, if the rank combination is defined by Rule 1 above, the grouping can be done as: {0, 3, 7, 12}, {1, 2, 4, 5, 6, 8, 9, 10, 11, 13, 14, 15, 16}. To further illustrate this example, the DM-RS ports indicated by the entry in the first group {0, 3, 7, 12} can be mapped to layer group based on the exemplary CDM group information shown in FIGS. 4A and 4B. The number of first layer group in this example is smaller or equal to the second layer group. The DM-RS port for each group is within same CDM group and can be considered QCLed. In this example, for the seventh entry, which is designed for total rank R=7, R1=3, and R2=4 by following Rule 1 shown above. Thus, port {2, 3, 8} is mapped to R1, and {0, 1, 6, 7} to R2. Port {2, 3, 8} is from same CDM group, and {0, 1, 6, 7} is also from the same CDM group.

For Rule 2 above, one or more reference signals can be mapped to an nth data stream group that can include Rn data streams. Rn can be computed according to:

$$\Sigma_{n=1}^{N} R_n = R,$$

where R1~Rn can have an integer value between [2, R−1], and R is a transmission rank. For some embodiments that use Rule 2, $R1 \leq \ldots \leq R_n$ so that R1 can be the lowest number of rank and Rn can be a highest number of rank supported in one data stream group.

In some other embodiments, a mapped resource within one group can be mapped to two or more data stream groups. In such embodiments, a number of data streams within an n-th group Rn can be computed based on the following equation:

$$\Sigma_{n=1}^{N} R_n = R,$$

where R is a transmission rank supported by a number of mapped resources and where R1≤ • • • ≤Rn so that R1 can be the lowest number of rank and Rn can be a highest number of rank supported in one data stream group.

In some implementations for the first embodiment, only one group is formed with a list of identifiers so that the one group can be selected by default without additional signaling. In some other implementations for the first embodiment, the selection of a group(s) can be indicated via an additional signal as further explained below.

In some embodiments, the selection is done by high layer signaling, for example, a MAC Control Element (CE) with bitmap. In such embodiments, the bit-width of codepoint in DCI for DM-RS configuration based on the activated group(s) can be calculated as:

$$B = \lceil \log_2 \Sigma_{n=1}^{N} l_n \rceil \text{ or } \Sigma_{n=1}^{N} l_n,$$

where, $l_n$ refers to a number of entry within the nth selected group.

In some other embodiments, the selection is done by DCI, and an additional bit-width $B_{add} = B_{group} = \lceil \log_2 N \rceil$ can be used to indicated the selected group. In such embodiments, the bit-width of code point in DCI for DM-RS configuration based on the activated group(s) can be organized as:

$$B_{DMRS} = \lceil \log_2 l_{Act} \rceil,$$

The $B_{add}$ can be in the separate codepoint or combing with $B_{DMRS}$ as the one codepoint $B_{add}B_{DMRS}$. In this embodiment, a bit-width of codepoint in DCI can include a first most significant bit that refers to a selected group followed by the selected identifier within the selected group.

b. Enabling or Disabling of Entries of a Reference Signal Table

In another exemplary embodiment that includes a predetermined DM-RS table, such as Table 2 with L identifiers or entries, part of the entry (L) can be enabled or disabled via the signaling, such as using a RRC message or a MAC CE message. As an example, the signaling can include: (a)

Bitmap signaling with L bits; or (b) Start and Length Indicator Value (SLIV) if one or more identifiers with continuous indexing are enabled or disabled, which can be calculated as:

if $(L_{Act}+1) \leq \lfloor L/2 \rfloor$ then SLIV=$L(L_{Act}-1)+L_{start}$ else SLIV=$L(L-L_{Act}+1)+(L-1-L_{start})$ where, L refers to a number of identifiers, $L_{start}$ refers to an identifier associated with a first entry that can be enable or disabled, $L_{Act}$ is a number of enabled or disabled identifiers.

In some embodiments, bitmap or SLIV signaling can also be performed in cases where only one group is formed. In this embodiment with the enabling or disabling feature, the bit-width of codepoint in DCI used for DM-RS configuration can be based on total number enabled entries in the table. In this embodiment, a bit-width of codepoint in DCI can include a first most significant bit that refers to a selected group followed by the selected identifier within the selected group.

II. Second Embodiment—Another Exemplary Configuration of Reference Signal (RS) for Flexible Mapping of CW to Transmission Layer In another exemplary embodiment, the configuration of DM-RS table or entries within table can be restricted via the signaling from network node. Signaling such as RRC, or MAC, or DCI, or any combination thereof, can be used to restrict the entries within the pre-determined table. For embodiments that use the DCI message, the bit-width in DCI for DM-RS port indication can be adaptive according to the grouping.

In this embodiment, the pre-defined table is organized based on the following principle. For given transmission rank R ($1 \leq R \leq R_{max}$, e.g., Rmax=8), the following combination of layer groups can be supported:

(R1,R2), here $R1+R2=R$, $(R1,R2 \in [2,R-1])$ and $R1 \leq R2$

The DM-RS groups assigned R1 or R2 can be QCLed.

TABLE 3

| | Two CW enabled |
|---|---|
| Entry ID | DMRS port(s) mapping to each layer in ascending order |
| 0 | 0-4 |
| 1 | 0-5 |
| 2 | 0, 1, 6, 2, 3, 8 |
| 4 | 2, 3, 8, 0, 1, 6, 7 |
| 5 | 0, 1, 6, 7, 4, 2, 3 |
| 6 | 2, 3, 0, 1, 6, 7, 4 |
| 8 | 0, 1, 6, 7, 2, 3, 8, 9 |
| 9 | 0, 1, 6, 2, 3, 8, 9, 4 |
| 10 | 2, 3, 4, 5, 0, 1, 6, 7 |

In some embodiments that can include a DM-RS mapping mode, a 1-bit $B_{add}$ can be added in DCI to indicate whether the order of DM-RS port index for selected entry is swapped or not. For example, if the first entry in Table 3 is selected by DCI codepoint $B_{DMRS}=\lceil \log_2 L \rceil$, then the DM-RS port to layer mapping will be 0~4 if $B_{add}=0$, otherwise the order will be 4~0. The existing of $B_{add}$ can be configured by a high layer signaling. A UE can support the flexible changes of ordering of the DM-RS port to layer mapping.

In some other embodiments, that can include a CW or TRP swap, a 1-bit $B_{add}$ can be added in DCI to indicate whether the correspondence between CW or TRP and the mapped DM-RS port to transmission rank has been swapped. For example, if $B_{add}=0$, the DM-RS ports mapping to layers R1 will be assigned to CW1 or TRP1, otherwise, the DM-RS ports mapping to layers R1 will be assigned to CW2 or TRP2.

III. Third Embodiment—An Exemplary Configuration of Reference Signal (RS) for Scheduling with Multiple Control Information Sets from Multiple Transmission Units

A. Scheme 1

In an exemplary embodiment of Scheme 1, the DM-RS table for the mth network node, such as the mth transmission reception unit, is configured to UE based on the DM-RS ports allocated to the mth network node and $N=\Sigma_1^M N_m$, where N refers to maximal supported RS number for UE in this embodiment, and can be reported by UE as capability.

This embodiment can include one or more of the following features. The allocation of one or more DM-RS ports to an n-th network node can be configured via a signaling, such as a RRC message. The DM-RS port that belong within a same CDM group may not be assigned to different TRUs that are not QCLed or that do not share same physical location or radio frequency (RF) properties or analogy beams. A set of reference signals, for example, DM-RS ports, can only be assigned to one TRU if only the fully overlapping resource allocation (RA) scheme is supported. If a set of reference signals, for example, DM-RS ports, can be assigned to multiple TRUs, only the non-overlapping RA is supported among these TRUs which share the same DM-RS point.

For the third embodiment, the mapping is based on a pre-defined table that includes a list of identifiers and a list of mapped resources. For the pre-defined table used for the third embodiment, each identifier can identify a set of mapped resource, and each mapped resource can identify the reference signals mapped to the network nodes. As an example, the pre-determined DM-RS table can be organized as follows for the mth or one of the transmission unit:

TABLE 4

| Entry ID | DMRS port(s) mapping to each layer in ascending order |
|---|---|
| 0 | P1 |
| 1 | P1, P2 |
| ... | ... |
| Lm | P1, P2, ~Pm | where, P1~Pm refers to the DM-RS ports that can be allocated to the mth TRU.

For the control information transmitted from the mth TRU, the bit-width of the codepoint to indicate the selected entry for DM-RS port can be calculated as $B_m=\lceil \log_2 L_m \rceil$.

In some implementations, a rate matching scheme can be used for scheme 1 of the third embodiment. Rate matching can involve using the time or frequency resource occupied by the reference signal for transmission of data so that reference signal transmissions may be proportional to data transmissions. As an example, if one DM-RS port can only be assigned to ith TRU, then the data transmission from mth TRU can rate match around all DM-RS ports assigned to M TRU except the port allocated for mth TRU and not be used in the data transmission, where M is an integer value. As another example, if one DM-RS port can be assigned to multiple TRUs, then the data transmission from mth TRU can rate match around port allocated for mth TRU and used in the data transmission.

B. Scheme 2

In an exemplary embodiment of Scheme 2, one DM-RS table supports up to max($N_m$) transmission rank that is predefined by N DM-RS ports, where Nm refers to the DM-RS ports allocated to mth TRU and $N=\Sigma_1^M N_m$, which means maximal supported RS number for UE in this embodiment, and can be reported by UE as capability.

In implementations associated with scheme 2 of the third embodiment, the Lm entries of this table are configured to mth TRU based on following options:

Option #1: The DM-RS port listed in the entry belong within same CDM group may not be assigned to different TRU.

Option #2: The entries containing certain DM-RS port can only be assigned to one TRU if only the fully overlapping RA scheme is supported.

Option #3: If the entries contain certain DM-RS port can be assigned to multiple TRUs, only the non-overlapping RA is supported among these TRUs which share the same entries.

For the control information transmitted from the mth TRU, the bit-width of the codepoint to indicate the selected entry for DM-RS port configuration can be calculated as $B_m=\lceil \log_2 L_m \rceil$.

In some implementations, a rate matching scheme can be used for scheme 2 of the third embodiment. As an example, if the entries containing certain DM-RS port can only be assigned to one TRU, then the data transmission from mth should rate match around all DM-RS ports assigned to M TRU except the port allocated for mth TRU and not be used in the data transmission. As another example, if the entries contain certain DM-RS port can be assigned to multiple TRUs, then the data transmission from mth should rate match around port allocated for mth TRU and used in the data transmission.

C. Scheme 3

In some implementations for scheme 3 of the third embodiment, the pre-defined DM-RS table can be organized based on the principle listed in first embodiment, $R=\Sigma_1^M R_m$, Rm refers to the supported transmission rank from each transmission unit.

TABLE 5

| | Two CW enabled |
|---|---|
| Entry ID | DMRS port(s) mapping to each layer in ascending order |
| 0 | 0-4 |
| 1 | 4, 0, 1, 2, 3 |
| 3 | 0-5 |
| 4 | 0, 1, 6, 2, 3, 8 |
| ... | ... |
| 17 | 2, 3, 4, 5, 0, 1, 6, 7 |

In some implementations of scheme 3 of the third embodiment, if multiple control information with same format are transmitted from different TRU to scheduling the corresponding data, then the same value in the codepoint for indicating the DM-RS port assignment can be transmitted in all control information. In some other implementations of scheme 3 of the third embodiment, if multiple control information is transmitted from different TRU to scheduling the corresponding data, the DCI codepoint for indicating the DM-RS port assignment can be transmitted in the control information from the host TRU.

In some implementations of the scheme 3 of the third embodiment, the DM-RS port listed in the indicated entry can be mapped to [R1~Rm] based on the pre-defined rule, for example, in an order from a first transmission rank R1 to a last transmission rank Rm.

For Schemes 1, 2, and 3, a reference signal can be selected by DCI and the bit-width of a codepoint in DCI can be based on a total number of mapped resources.

In this patent document, the features that relate to TRP, TRU, or transmission unit in the various discussed embodiments can also be implemented on other network nodes, such as a BS, or a relay point, or a UE.

Figure 2:
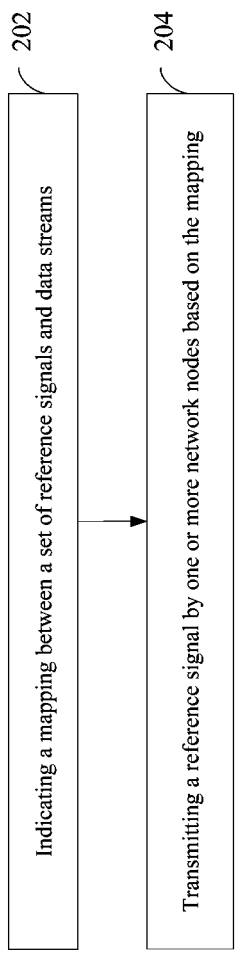
FIG. 2 shows an exemplary flowchart to be implemented by a network node for mapping reference signals to data streams.

FIG. 2 shows an exemplary flowchart to be implemented by a network node for mapping reference signals to data streams. At the indicating operation 202, the network node can indicate a mapping between a set of reference signals and data streams. The mapping can be indicated by a pre-defined table that is organized and used based on rules as discussed in this patent document. For example, a pre-defined table an include identifiers and mapped resources, where each identifier identifies a set of mapped resources. In some embodiments, the mapped resource can identify a reference signal mapped to a data stream. In some other embodiments, the mapped resource can identify a reference signal mapped to the network nodes.

At the transmitting operation 204, a reference signal is transmitted by one or more network nodes based on the mapping as described in this patent document.

Figure 3:
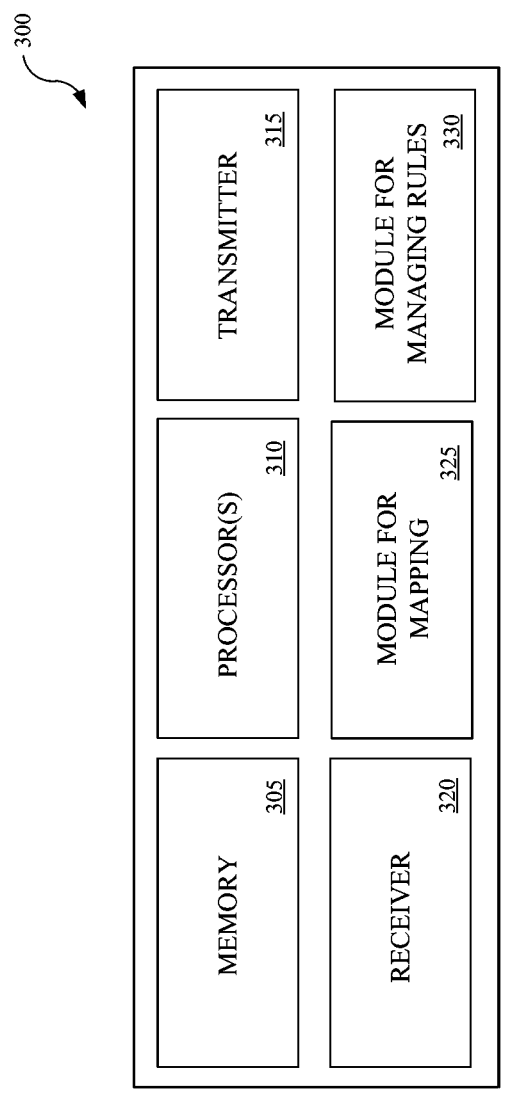
FIG. 3 shows a block diagram for a network node to configure reference signals.

FIG. 3 shows a block diagram for a network node to configure reference signals. The network node 300 includes at least one processor 310 and a memory 305 having instructions stored thereupon. The instructions upon execution by the processor 310 configure the network node 300 to perform several operations using the various modules. The network node 300 includes a transmitter 315 and a receiver 320 for sending data and control information, such as reference signals, to other network nodes.

The network node 300 also includes a module for mapping 325 that can indicate a mapping between a set of reference signals and data streams. The module for mapping 325 can include a pre-defined table with entries that are organized and used based on the rules as described in the embodiments described in this patent document. The module for managing rules 330 can specify the various rules for using the pre-defined table. As an example, a number of CDM groups occupied by the mapped resources within one group can be the same. As another example, a set of reference signals can be assigned to one network node where a fully overlapping RA scheme is supported.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
    transmitting a reference signal by one or more network nodes based on a mapping between a set of reference signals and data streams;
        wherein the mapping is based on a rule,
        wherein the rule based mapping is indicated by a pre-defined table that includes a list of identifiers and a list of mapped resources,
        wherein each identifier identifies a set of mapped resources,
        wherein each mapped resource identifies one reference signal mapped to one data stream,
        wherein the list of identifiers are grouped to form one or more groups,
        wherein the one or more groups are selected by a high-layer signaling message,
        wherein the high-layer signaling message includes a MAC Control Element (CE) signaling message, and
        wherein a bit-width $B_{entry}$ of a codepoint in a downlink control indicator (DCI) is computed based on:

$$B_{entry} = \lceil \log_2 \Sigma_{n=1}^{N} q_n \rceil \text{ or } \Sigma_{n=1}^{N} q_n \text{ bits,}$$

where, $1_n$ refers to a number of identifiers within the selected group.

2. The wireless communication method of claim 1, wherein at least one group includes a same number of mapped resources.

3. The wireless communication method of claim 1, wherein at least one group includes a same number of code division multiplexing (CDM) groups occupied by the mapped resources.

4. The wireless communication method of claim 1,
    wherein the one or more groups are selected by a downlink control indicator (DCI), and
    wherein a bit-width $B_{group}$ of a codepoint in the DCI is computed based on a total number of the one or more groups or $\lceil \log_2 N \rceil$, where N refers to the total number of the one or more groups.

5. The wireless communication method of claim 1, wherein an order of the reference signal mapped to data streams is modified via a downlink control indicator (DCI).

6. An apparatus for wireless communication, comprising a memory and a processor, wherein the processor reads code from the memory and implements a method comprising:
    transmit a reference signal by one or more network nodes based on a mapping between a set of reference signals and data streams;
        wherein the mapping is based on a rule,
        wherein the rule based mapping is indicated by a pre-defined table that includes a list of identifiers and a list of mapped resources,
        wherein each identifier identifies a set of mapped resources,
        wherein each mapped resource identifies one reference signal mapped to one data stream,
        wherein the list of identifiers are grouped to form one or more groups,
        wherein the one or more groups are selected by a high-layer signaling message,
        wherein the high-layer signaling message includes a MAC Control Element (CE) signaling message, and
        wherein a bit-width $B_{entry}$ of a codepoint in a downlink control indicator (DCI) is computed based on:

$$B_{entry} = \lceil \log_2 \Sigma_{n=1}^{N} q_n \rceil \text{ or } \Sigma_{n=1}^{N} q_n \text{ bits,}$$

where, $1_n$ refers to a number of identifiers within the selected group.

7. The apparatus of claim 6, wherein at least one group includes a same number of mapped resources.

8. The apparatus of claim 6, wherein at least one group includes a same number of code division multiplexing (CDM) groups occupied by the mapped resources.

9. The apparatus of claim 6,
wherein the one or more groups are selected by a downlink control indicator (DCI), and
wherein a bit-width $B_{group}$ of a codepoint in the DCI is computed based on a total number of the one or more groups or $\lceil \log_2 N \rceil$, where N refers to the total number of the one or more groups.

10. The apparatus of claim 6, wherein an order of the reference signal mapped to data streams is modified via a downlink control indicator (DCI).

11. A non-transitory computer readable program storage medium having code stored thereon, the code, when executed by a processor, causing the processor to implement a method comprising:
   transmitting a reference signal by one or more network nodes based on a mapping between a set of reference signals and data streams;
   wherein the mapping is based on a rule,
   wherein the rule based mapping is indicated by a pre-defined table that includes a list of identifiers and a list of mapped resources,
   wherein each identifier identifies a set of mapped resources,
   wherein each mapped resource identifies one reference signal mapped to one data stream,
   wherein the list of identifiers are grouped to form one or more groups,
   wherein the one or more groups are selected by a high-layer signaling message,
   wherein the high-layer signaling message includes a MAC Control Element (CE) signaling message, and
   wherein a bit-width $B_{entry}$ of a codepoint in a downlink control indicator (DCI) is computed based on:

$$B_{entry} = \lceil \log_2 \Sigma_{n=1}^N q_n \rceil \text{ or } \Sigma_{n=1}^N q_n \text{ bits,}$$

where, $l_n$ refers to a number of identifiers within the selected group.

12. The non-transitory computer readable program storage medium of claim 11, wherein at least one group includes a same number of mapped resources.

13. The non-transitory computer readable program storage medium of claim 11, wherein at least one group includes a same number of code division multiplexing (CDM) groups occupied by the mapped resources.

14. The non-transitory computer readable program storage medium of claim 11,
wherein the one or more groups are selected by a downlink control indicator (DCI), and
wherein a bit-width $B_{group}$ of a codepoint in the DCI is computed based on a total number of the one or more groups or $\lceil \log_2 N \rceil$, where N refers to the total number of the one or more groups.

* * * * *